US012764053B2

(12) United States Patent
Hew et al.

(10) Patent No.: US 12,764,053 B2
(45) Date of Patent: Oct. 13, 2026

(54) METHOD OF GENERATING AND ASSIGNING IDENTIFIER INFORMATION TO EACH ROUTER IN A NETWORK ON-CHIP FOR ARBITRATING A DATA PACKET

(71) Applicant: SKYECHIP BERHAD, Bayan Lepas (MY)

(72) Inventors: Yin Chong Hew, Bayan Lepas (MY); Soon Hock Saw, Bayan Lepas (MY); Kee Xian Low, Bayan Lepas (MY); Yeong Tat Liew, Bayan Lepas (MY)

(73) Assignee: SKYCHIP BERHAD (MY)

( * ) Notice: Subject to any disclaimer, the term of this patent is extended or adjusted under 35 U.S.C. 154(b) by 322 days.

(21) Appl. No.: 18/417,849

(22) Filed: Jan. 19, 2024

(65) Prior Publication Data

US 2025/0141779 A1 May 1, 2025

(51) Int. Cl.
*H04L 45/12* (2022.01)
*H04L 45/00* (2022.01)
*H04L 45/28* (2022.01)

(52) U.S. Cl.
CPC .............. *H04L 45/12* (2013.01); *H04L 45/28* (2013.01); *H04L 45/566* (2013.01)

(58) Field of Classification Search
CPC ........ H04L 45/12; H04L 45/28; H04L 45/566
See application file for complete search history.

(56) References Cited

U.S. PATENT DOCUMENTS 11,398,980 B2 * 7/2022 Bharadwaj ............ H04L 49/254
2005/0135231 A1 * 6/2005 Bellovin ................. H04L 45/02 370/216
2014/0177473 A1 * 6/2014 Kumar .................... H04L 45/58 370/255
2020/0153757 A1 * 5/2020 Bharadwaj .............. H04L 45/58
2022/0309699 A1 * 9/2022 Okamori .............. G05D 1/1064
2024/0163247 A1 * 5/2024 Nishiguchi ......... H04L 61/5014

FOREIGN PATENT DOCUMENTS

EP 4036730 A1 8/2022

* cited by examiner

*Primary Examiner* — Kan Yuen
(74) *Attorney, Agent, or Firm* — Jayne Saydah

(57) ABSTRACT

The invention relates to a computer-implemented method (100) of generating and assigning identifier information to each router in a network-on-chip for arbitrating data packets. The method (100) comprises the steps of: generating and assigning a planar-axis coordinate, Z, for each router; generating and assigning an ascending value to each router link layer for every link between two routers of the same coordinate; selecting the origin router with the smallest value; assigning a coordinate comprising a horizontal-axis (X) and a vertical-axis (Y); calculating the distance of the coordinates; generating and assigning coordinates to adjacent routers; applying coordinate shrinking to get all coordinates in positive integer numbers with optimized ascending order; and repeating the steps to complete the generation and assignment of coordinates to all planar-axis routers.

10 Claims, 9 Drawing Sheets

METHOD OF GENERATING AND ASSIGNING IDENTIFIER INFORMATION TO EACH ROUTER IN A NETWORK ON-CHIP FOR ARBITRATING A DATA PACKET

CROSS-REFERENCE TO RELATED APPLICATION(S)

This application claims priority from and the benefit of Malaysian Patent Application No. PI2023006704 filed on Nov. 1, 2023, which is hereby incorporated by reference in its entirety.

TECHNICAL FIELD

The present invention relates generally to arbitration of data packets in a network-on-chip (NoC). More particularly, the present invention relates to a method of generating and assigning identifier information to each router in a NoC for data packets arbitration.

BACKGROUND ART

A conventional method of generating and assigning identifier information to each router in a network-on-chip requires the user to specify and draw the network-on-chip (NoC) topology in a fixed coordinate logical view floorplan, which includes pre-fixed X-Y (two-dimensional) coordinates for each router. This can be done via a graphical user interface or command-line input. The user manually specifies a unique identifier for each router connected in the NoC topology, which can be susceptible to user errors.

There have been several solutions provided to improve the method of generating and assigning identifier information to each router in a network on-chip for arbitrating a data packet, and one of them has been discussed below:

EP4036730A1 discloses methods and systems for executing an application data flow graph using a network of computational nodes. In specific examples, the network of computational nodes can be a network-on-chip for a multicore processor. One method includes transitioning first-application data from a first-source computational node to an intermediary computational node. The method can also include providing second application data, from a computation layer of the network of computational nodes, on the intermediary computational node. The method can also include multicasting the first application data in combination with the second application data from the intermediary computational node to at least two destination computational nodes. The first source computational node, the intermediary computational node, and at least two destination computational nodes are all in the network of computational nodes.

The aforementioned reference provides methods and systems for executing an application data flow graph using a network of computational nodes. Nevertheless, it still has a number of limitation and shortcoming. Accordingly, there remains a need to provide a scalable method to automatically generate and assign a unique identifier to each router that is applicable for full and custom mesh-based network-on-chip (NoC) topologies in both physical and logical view floorplan NoC designs.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a scalable method to automatically generate and assign a unique identifier to each router that is applicable for full and custom mesh-based network-on-chip (NoC) topologies in both physical and logical view floorplan NoC designs.

It is further an objective of the present invention to provide two-dimensional and three-dimensional mesh topology NoC with source-based routing architectures using each router's unique identifier to generate a data packet for transaction, whereby the source node of the data packet decides the entire route that the data packet will follow to reach its destination or target node.

It is also an objective of the present invention to provide a complete routing information into the data packet specifying each router via the unique identifier where the data packet should traverse, wherein the routing information comprises absolute coordinates, relative directions, and/or output port number for each router to arbitrate the data packet.

Accordingly, these objectives may be achieved by following the teachings of the present invention. The present invention relates to a method of generating and assigning identifier information to each router in a network-on-chip for arbitrating a data packet; characterized by the steps of: generating and assigning a planar-axis coordinate, Z, to every router for each planar; generating and assigning an ascending value to each router link layer for every link in between two routers of the same planar-axis coordinate; selecting one router with the smallest value of the router link layer as an origin router; assigning the origin router with a coordinate comprising a horizontal-axis, X, and a vertical-axis, Y; calculating the distance of the coordinates X and Y with respect to the router link layer for every router link layer; generating and assigning a coordinate comprises a horizontal-axis, X, and a vertical axis, Y, to each router adjacent to the origin router based on the distance calculated for every router link layer, followed by the next connecting router of the same planar-axis coordinate; applying coordinate shrinking to get all coordinates in positive integer numbers with optimized ascending order; and repeating the steps from generating and assigning an ascending value to each router link layer for every link in between two routers of the subsequent planar-axis coordinate to complete the generation and assignment of coordinates to all planar-axis routers.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figures, with like reference numbers referring to like structures across the views, wherein.

DETAILED DESCRIPTION OF THE INVENTION

Figure 1:
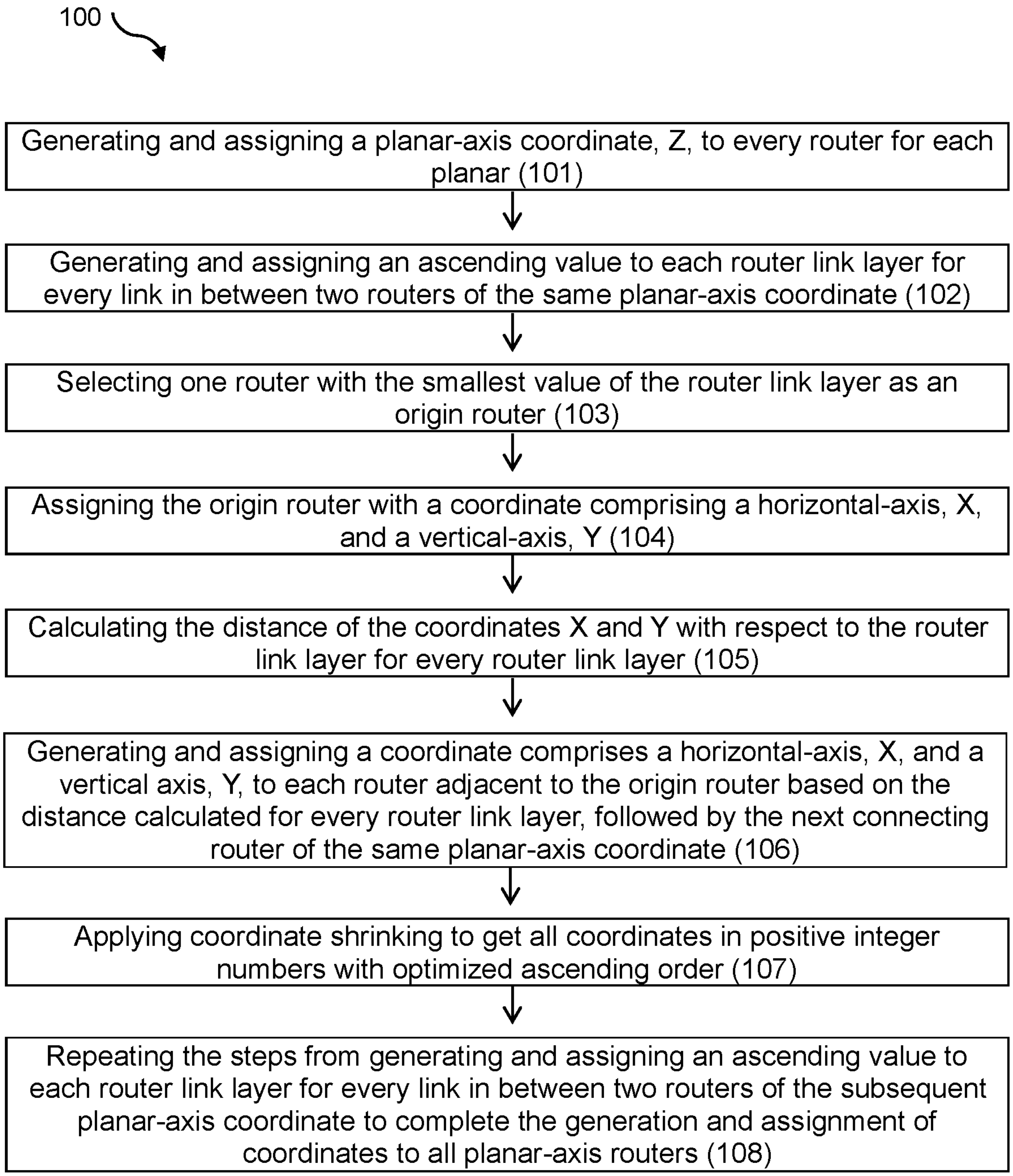
FIG. 1 is a flow diagram illustrating a method of generating and assigning identifier information to each router in a network-on-chip (NoC) for arbitrating a data packet in accordance with an embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings, the invention will now be described in more details.

The present invention relates to a computer-implemented method (100) of generating and assigning identifier information to each router in a network-on-chip for arbitrating a data packet; characterized by the steps of: generating and assigning a planar-axis coordinate, Z, to every router for each planar (101); generating and assigning an ascending value to each router link layer for every link in between two routers of the same planar-axis coordinate (102); selecting one router with the smallest value of the router link layer as an origin router (103); assigning the origin router with a coordinate comprising a horizontal-axis, X, and a vertical-axis, Y (104); calculating the distance of the coordinates X and Y with respect to the router link layer for every router link layer (105); generating and assigning a coordinate comprises a horizontal-axis, X, and a vertical axis, Y, to each router adjacent to the origin router based on the distance calculated for every router link layer, followed by the next connecting router of the same planar-axis coordinate (106); applying coordinate shrinking to get all coordinates in positive integer numbers with optimized ascending order (107); and repeating the steps from generating and assigning an ascending value to each router link layer for every link in between two routers of the subsequent planar-axis coordinate to complete the generation and assignment of coordinates to all planar-axis routers (108), as shown in FIG. 1.

In accordance with an embodiment of the present invention, generating and assigning 0 or ignoring the planar-axis coordinate, Z if the network-on-chip is a two-dimensional mesh topology having a single planar.

In accordance with an embodiment of the present invention, generating and assigning 0 as the planar-axis coordinate, Z for the bottom planar, and incrementing or decrementing the integer by +1 or −1 for the subsequent planar if the network-on-chip is a three-dimensional mesh topology having multiple planar.

In accordance with an embodiment of the present invention, assigning the origin router with the coordinate comprises horizontal-axis, X, and vertical-axis, Y equals to zero.

In accordance with an embodiment of the present invention, the step of generating and assigning a coordinate comprises horizontal-axis, X, and vertical-axis, Y to each router adjacent to the origin router followed by the next connecting router of the same planar-axis coordinate further comprising the steps of: detecting misalignment of routers that have assigned with the coordinate; calculating the distance for every router link layer; and generating a new coordinate based on the router link layer value and direction from the previous assigned router.

In accordance with an embodiment of the present invention, detecting misalignment of routers that have assigned with the coordinate, comprising the steps of: comparing the horizontal-axis, X, the vertical-axis, Y, or both X and Y coordinates of two connected routers; wherein misalignment is identified when the vertical-axis, Y, coordinate of both routers are different for an east or west port direction, and when the horizontal-axis, X, coordinate values of both routers are different for a north or south port direction.

In accordance with an embodiment of the present invention, after identifying the misalignment, resolving the misalignment by changing the horizontal-axis, X, coordinates and the vertical-axis, Y, coordinates of the newly assigned router to match the horizontal-axis, X, coordinates and the vertical-axis, Y, coordinates of the connected routers.

In accordance with an embodiment of the present invention, the step of embedding the identifier information of each router after generation and assignment into the data packet.

In accordance with an embodiment of the present invention, the identifier information includes absolute coordinates, relative directions, output port number or any combination thereof for each router to arbitrate the data packet.

In accordance with an embodiment of the present invention, applying coordinate shrinking to get all coordinates in positive integer numbers with optimized ascending order comprising the steps of: sorting the horizontal-axis, X, coordinates, and the vertical-axis, Y, coordinates in ascending or descending order; mapping the horizontal-axis, X, coordinates, and the vertical-axis, Y, coordinates to a positive integer number with incremental +1 for ascending order or decremental −1 for descending order; and updating the horizontal-axis, X, coordinates, and the vertical-axis, Y, coordinates of every router with the mapped value.

Hereinafter, examples of the present invention will be provided for more detailed explanation. The advantages of the present invention may be more readily understood and put into practical effect from these examples. However, it is to be understood that the following examples are not intended to limit the scope of the present invention in any ways.

Examples

Figure 2:
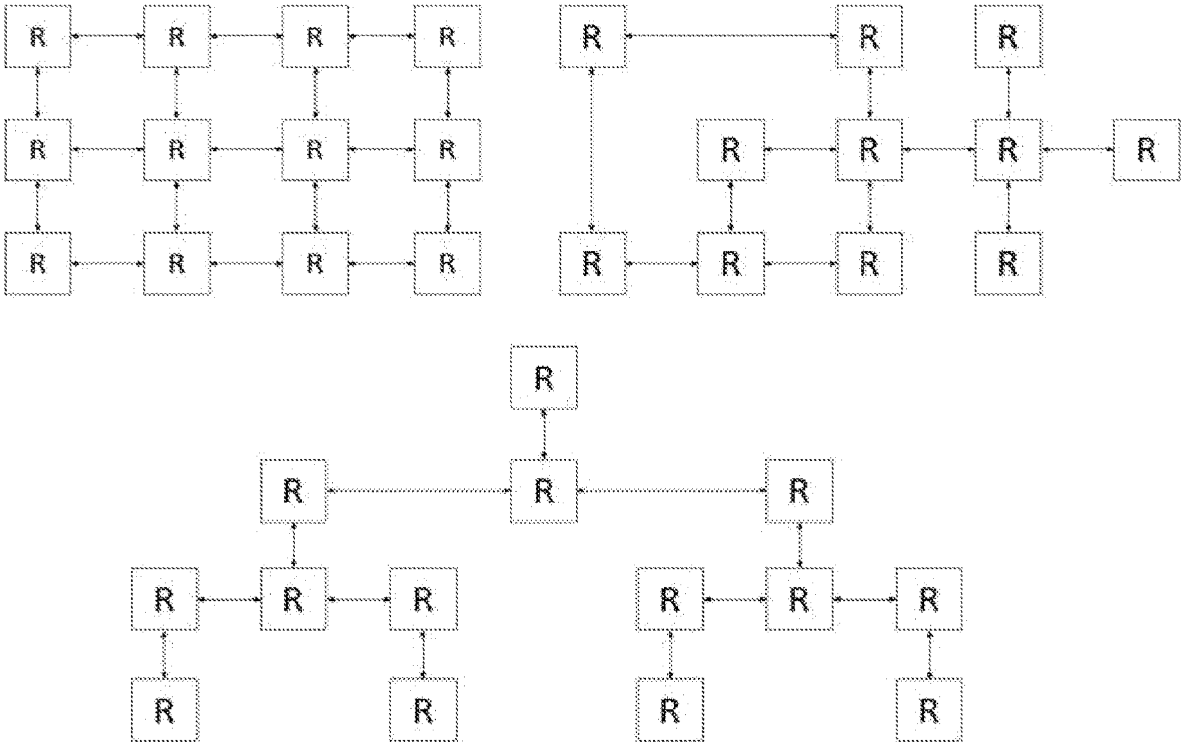
FIG. 2 is an example illustrating NoC topology, "R" boxes representing routers including 3×4 full mesh (Top Left), custom mesh (Top Right), and custom mesh to mimic Tree (Bottom)

FIG. 2 is an example illustrating NoC topology, "R" boxes representing routers including 3×4 full mesh (Top Left), custom mesh (Top Right), and custom mesh to mimic Tree (Bottom).

Figure 3A:
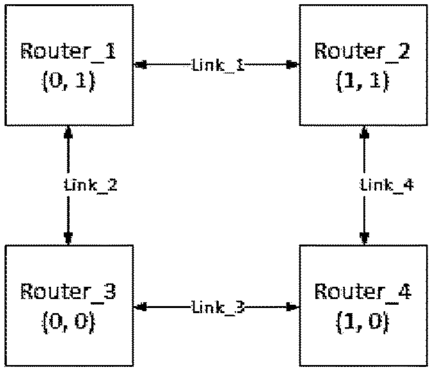
FIG. 3A is an example illustrating a logical view, and FIG. 3B illustrating a physical view of a two-dimensional full mesh 2×2 NoC topology.
Figure 3B:
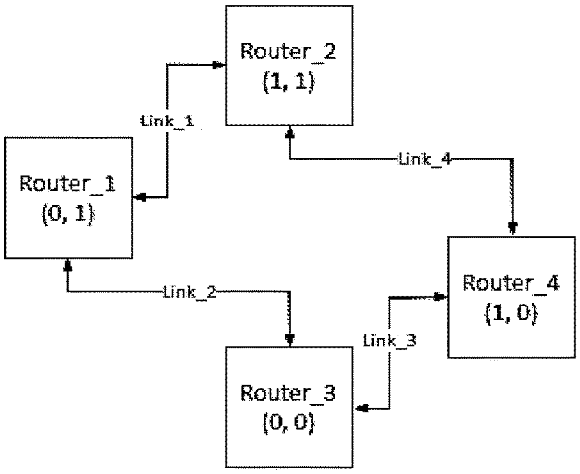

FIG. 3A is an example illustrating a logical view, and FIG. 3B illustrating a physical view of a two-dimensional full mesh 2×2 NoC topology where each router is represented by a unique coordinate (X, Y), with (0, 0) representing the bottom left of a logical view two-dimensional (2D) coordinate. The logical view shows the routers arranged in a grid-like pattern whereas the physical view shows the routers can be freely arranged based on physical floorplan of a computer-aided design tool. For actual implementation, each router can be represented by a unique identifier (ID) to indicate the direction of horizontal-axis or X, the direction of vertical-axis or Y, and the direction of different planar-axis or Z in any order. For example, (X, Y, Z), (X, Z, Y), (Y, X, Z), (Y, Z, X), (Z, X, Y), and (Z, Y, X). Moreover, the coordinate (0, 0, 0) can represent any starting location.

Figure 4:
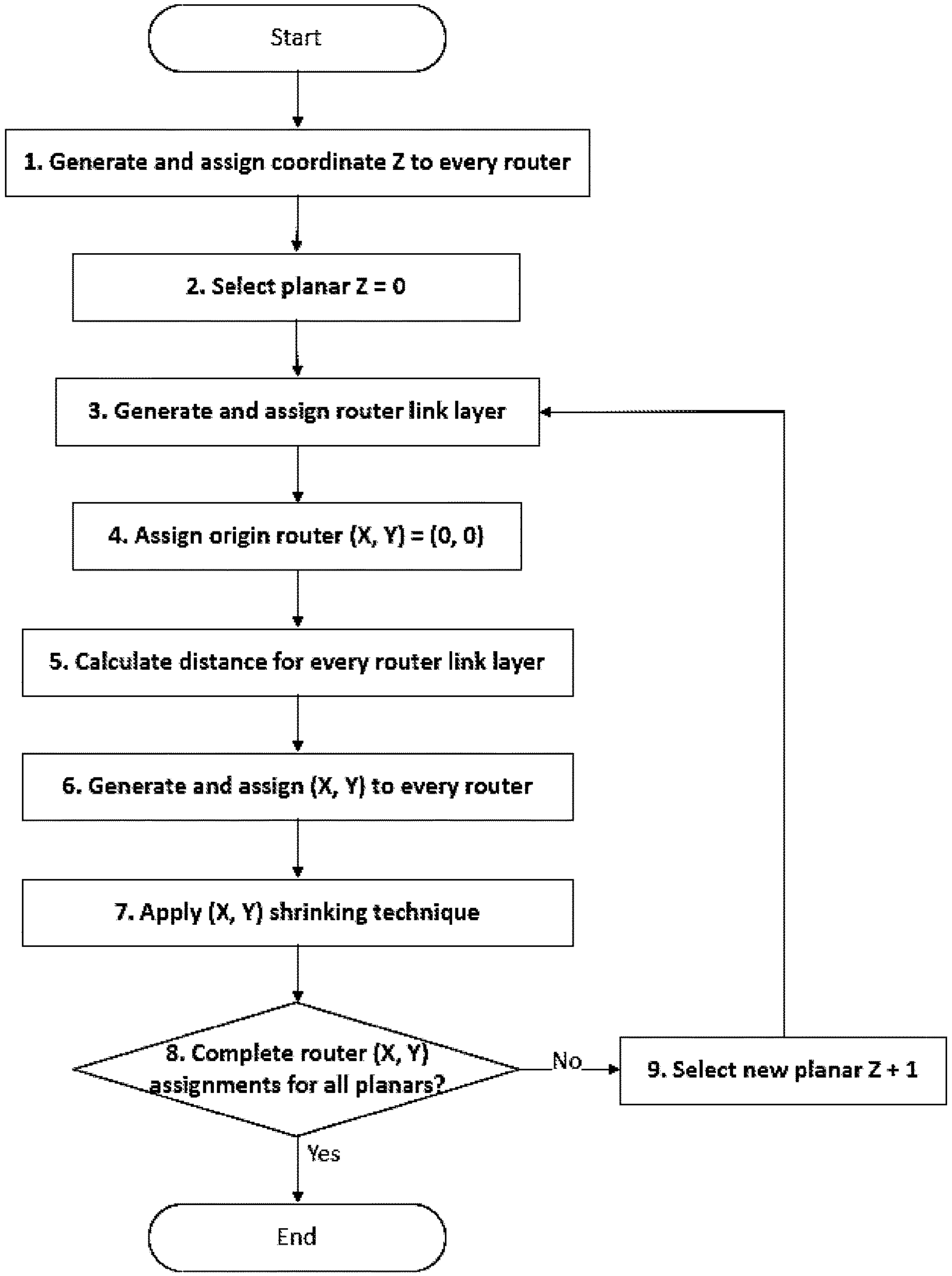
FIG. 4 is a flow diagram illustrating a process of unique router identifier information generation and assignment in accordance with an embodiment of the present invention.

FIG. 4 is a flow diagram illustrating a process of unique router identifier information generation and assignment in accordance with an embodiment of the present invention. The detailed description for each flow stated in FIG. 4 is provided in the following subsections.

1. Generate and Assign Coordinate Z to Every Router:

For 3D NoC, where each router coordinate is represented by (X, Y, Z), generate and assign different coordinates Z to all routers located at different planar points while keeping coordinates X and Y unassigned.

For 3D NoC, Z=0 for the bottom planar and then incremented by a positive integer +1 for every planar above.

For 2D NoC with single planar, Z=0 or can be ignored, where each router is represented with a coordinate (X, Y) only.

2. Select Planar Z=0:

Start the generation and assignment of coordinates (X, Y) to every router for each planar, starting with Z=0.

3. Generate and Assign the Router Link Layer:

Generate and assign the router link layer for every NoC link (in between two routers), with every router as a starting router to identify the origin router that has the smallest maximum link layer.

Figure 5:
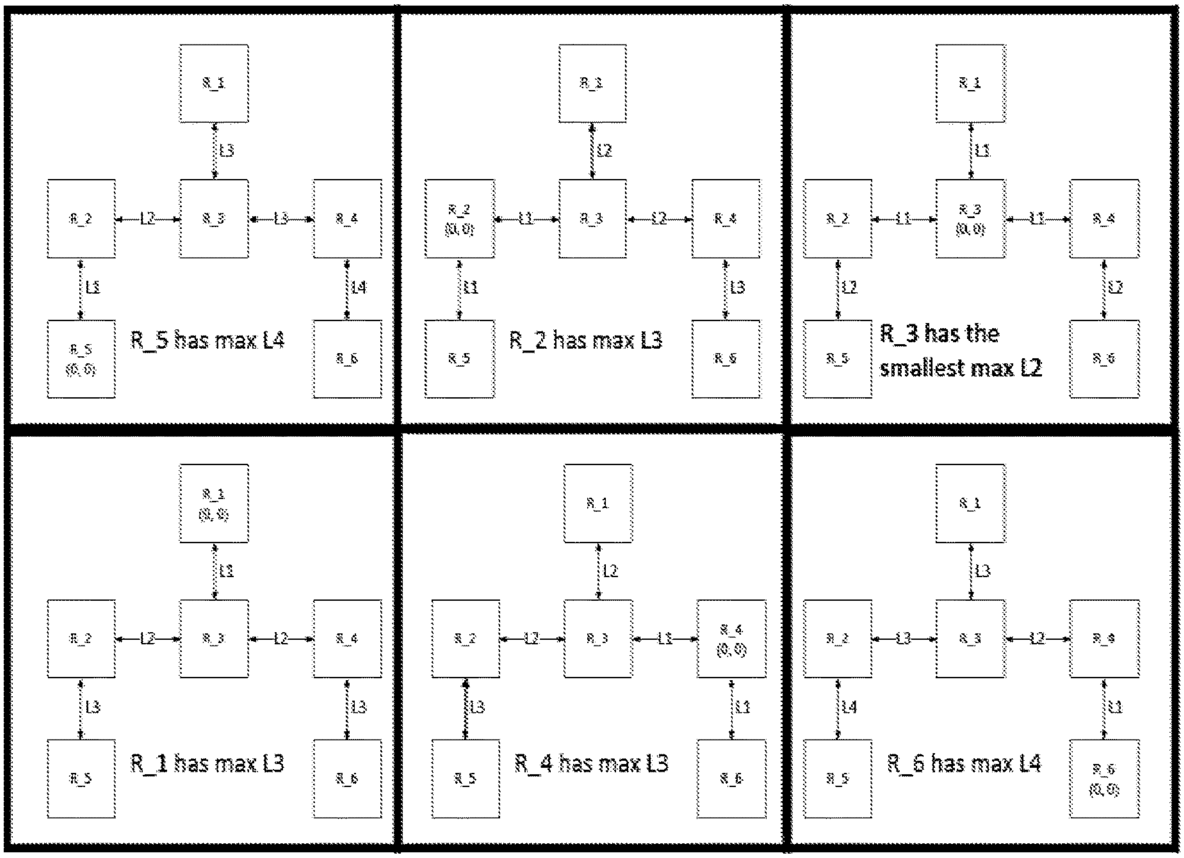
FIG. 5 is an example illustrating a tree topology with router link layer generation and assignment with every router as a starting point (R_3 has the smallest maximum link layer, L2)
Figure 6:
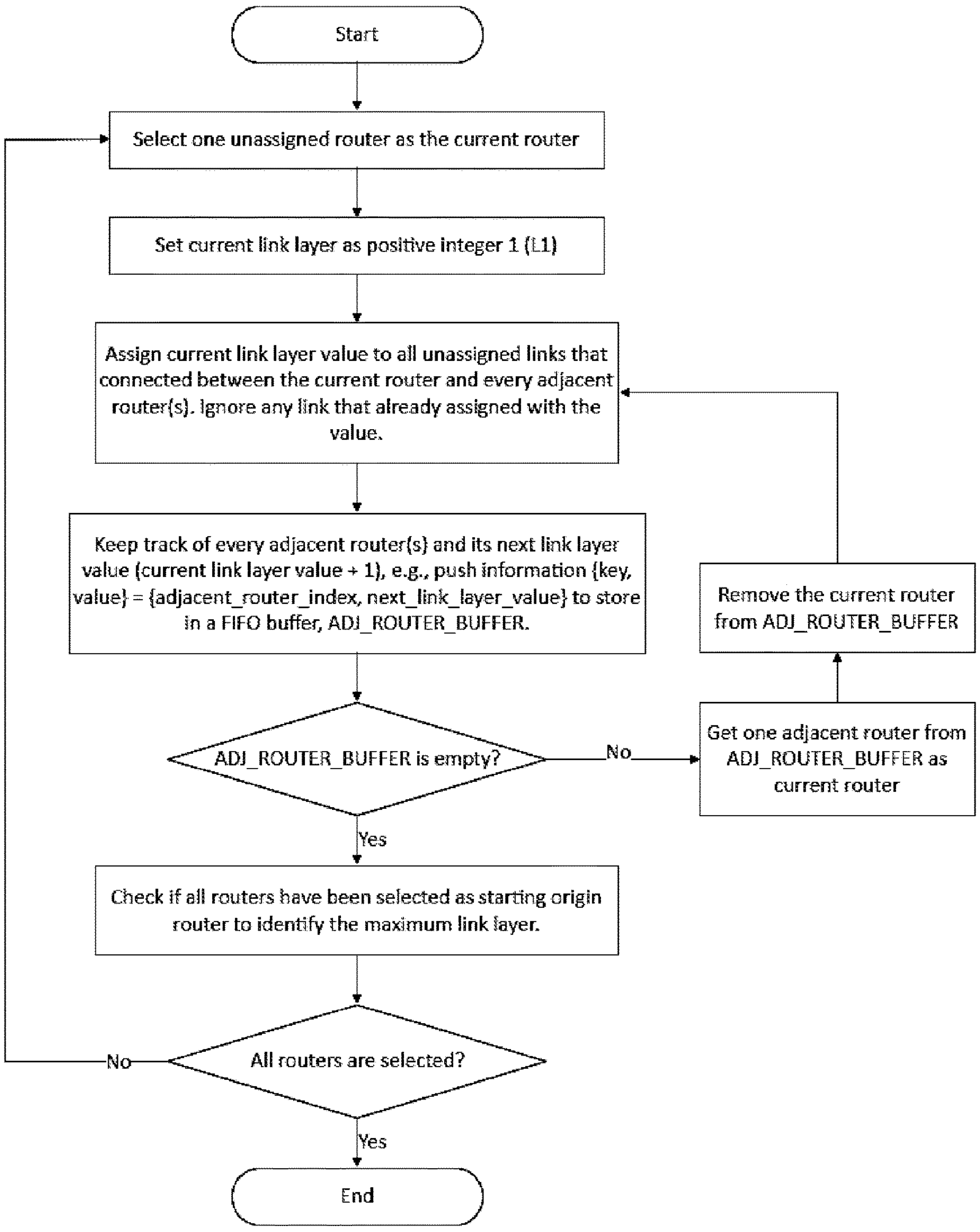
FIG. 6 is a flow diagram illustrating a process of the router link layer generation and assignment in accordance with an embodiment of the present invention.

The router link layer is a positive integer number used to indicate how many NoC links a transaction needs to travel to pass through from the origin router to reach the next connecting router, as illustrated in FIG. 5.

It is important (though not necessary) to assign the origin router with the smallest maximum link layer so that the router ID with coordinates (X, Y) using this method can be represented in the logical view floorplan for a balanced NoC topology, such as the tree topology as shown in FIG. 5.

4. Assign the Origin Router (X, Y)=(0, 0):

Assign one origin router that has the smallest maximum link layer with coordinates (X, Y)=(0, 0). If two or more routers have the smallest maximum link layer, then one of them can be assigned as the origin router.

5. Calculate Distance for Every Router Link Layer:

Calculate the $X_{Ln}$ and $Y_{Ln}$, which are the coordinate X and Y distances, respectively, for every router link layer value "n". For example, $X_{L3}$ is the coordinate X link distance for router link layer L3.

$X_{Ln}$ and $Y_{Ln}$ formulas are shown below, where LOR is the number of left-over routers that are connected to the maximum router link layer only and MAX is the maximum router link layer value.

$$X_{Ln} = \begin{cases} 3 * X_{L(n+1)}, & 1 \le n \le (\text{MAX} - 2) \\ (2 * X_{LMAX}) + 1, & n = (\text{MAX} - 1) \\ LOR, & n = \text{MAX} \end{cases}$$

$$Y_{Ln} = \begin{cases} 3 * Y_{L(n+1)}, & 1 \le n \le (\text{MAX} - 2) \\ (2 * Y_{LMAX}) + 1, & n = (\text{MAX} - 1) \\ LOR, & n = \text{MAX} \end{cases}$$

Figure 7:
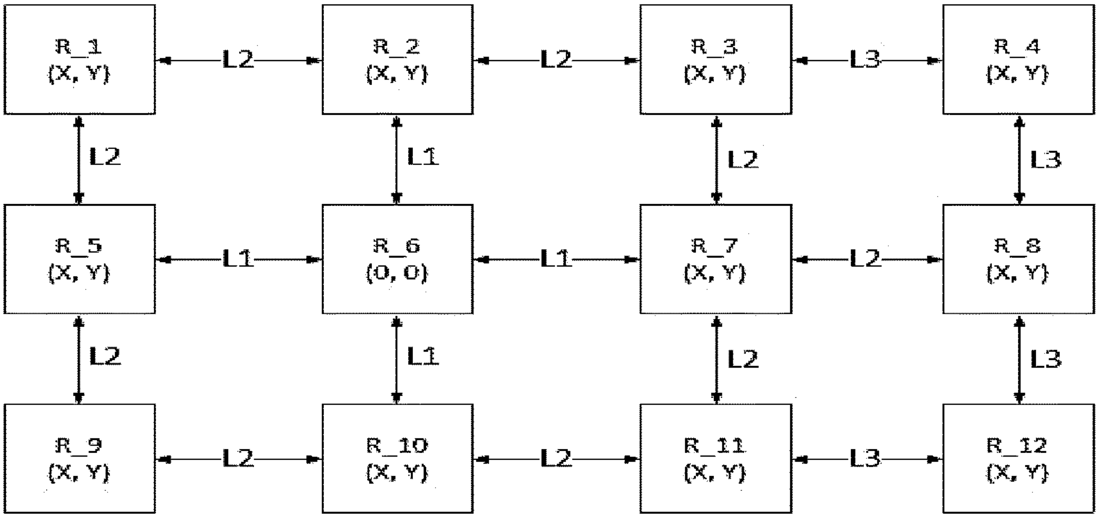
FIG. 7 is an example illustrating a 3×4 full mesh topology where R_6 is assigned as the origin router (0, 0)

FIG. 7 shows a 3×4 full mesh topology with a maximum router link layer value (MAX) of L3, or integer value 3. Besides, both routers R_4 and R_12 are connected to the MAX L3 only, so the number of the left-over router (LOR) is 2.

The coordinate X and Y distances for every router link layer in this 3×4 full mesh topology can be calculated using the formula stated above:

$$X_{L3} \text{ and } Y_{L3} = LOR = 2$$

$$X_{L2} \text{ and } Y_{L2} = (2 * LOR) + 1 = 5$$

$$X_{L1} \text{ and } Y_{L1} = 3 * 5 = 15$$

The actual implementation can vary by selecting different $X_{Ln}$ and $Y_{Ln}$ values to represent the coordinate X and Y distance, respectively, for every router link layer value "n".

6. Generate and Assign (X, Y) to Every Router:

Generate and assign coordinates (X, Y) to the adjacent router (that hasn't been assigned the coordinate) that is connected to the previous assigned router, starting from the origin router (0, 0) until all the routers are assigned the coordinates (X, Y).

Figure 8:
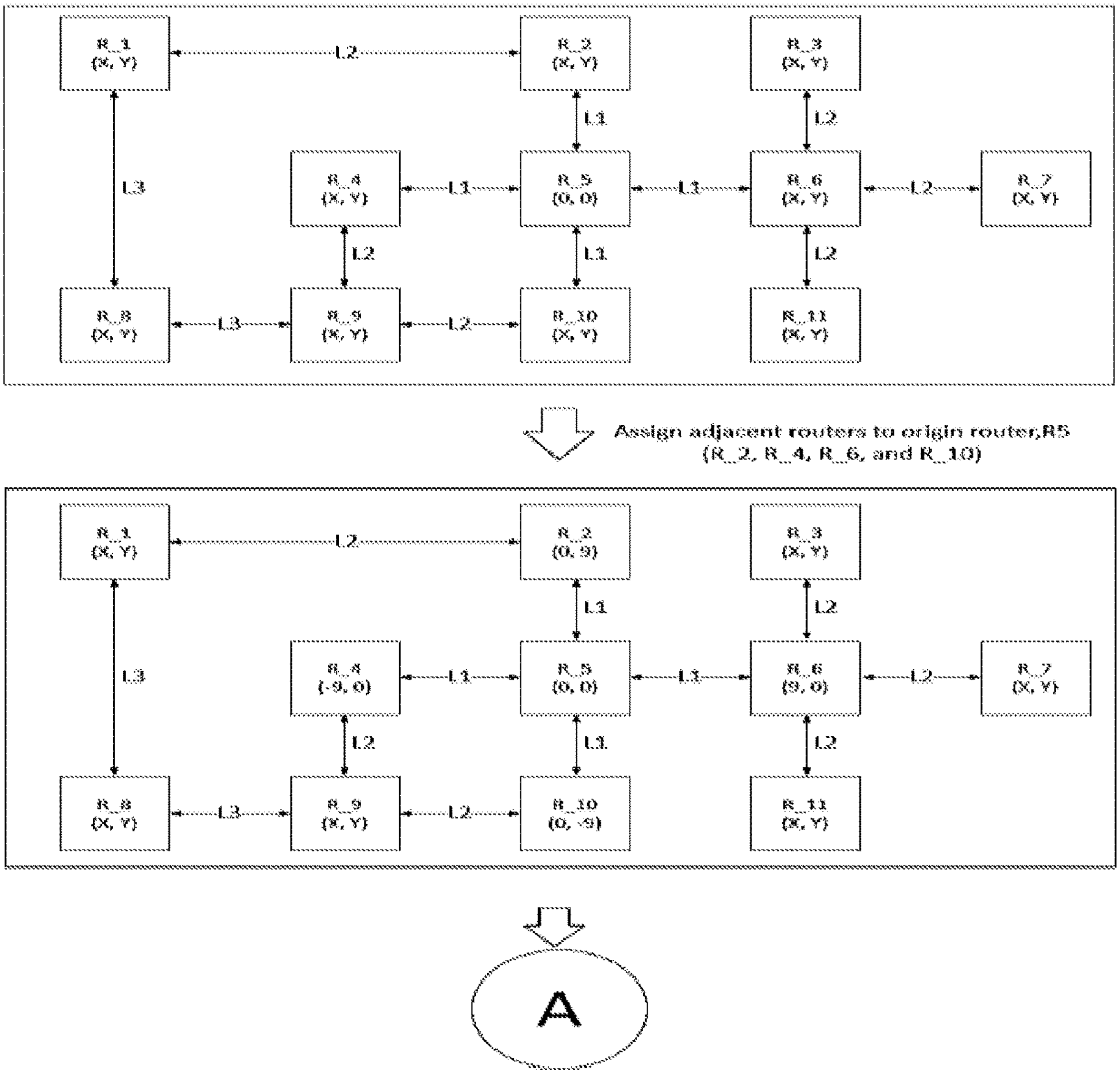
FIG. 8 is an example illustrating part-one of a process flow of generating and assigning unique router (X, Y) including of resolving coordinate misalignment of a custom mesh topology.
Figure 9:
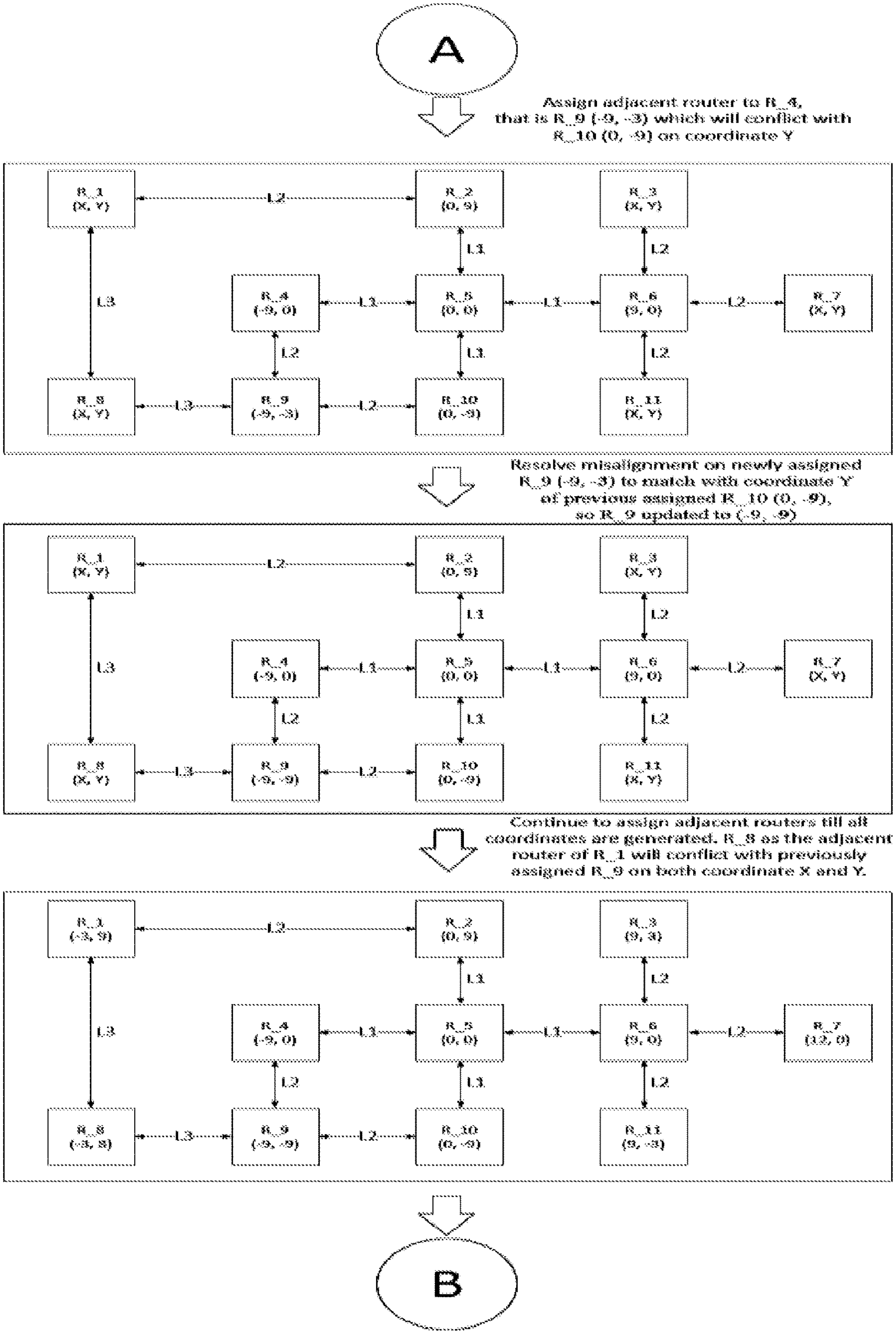
FIG. 9 is an example illustrating part-two of the process flow in continuation to FIG. 8.
Figure 10:
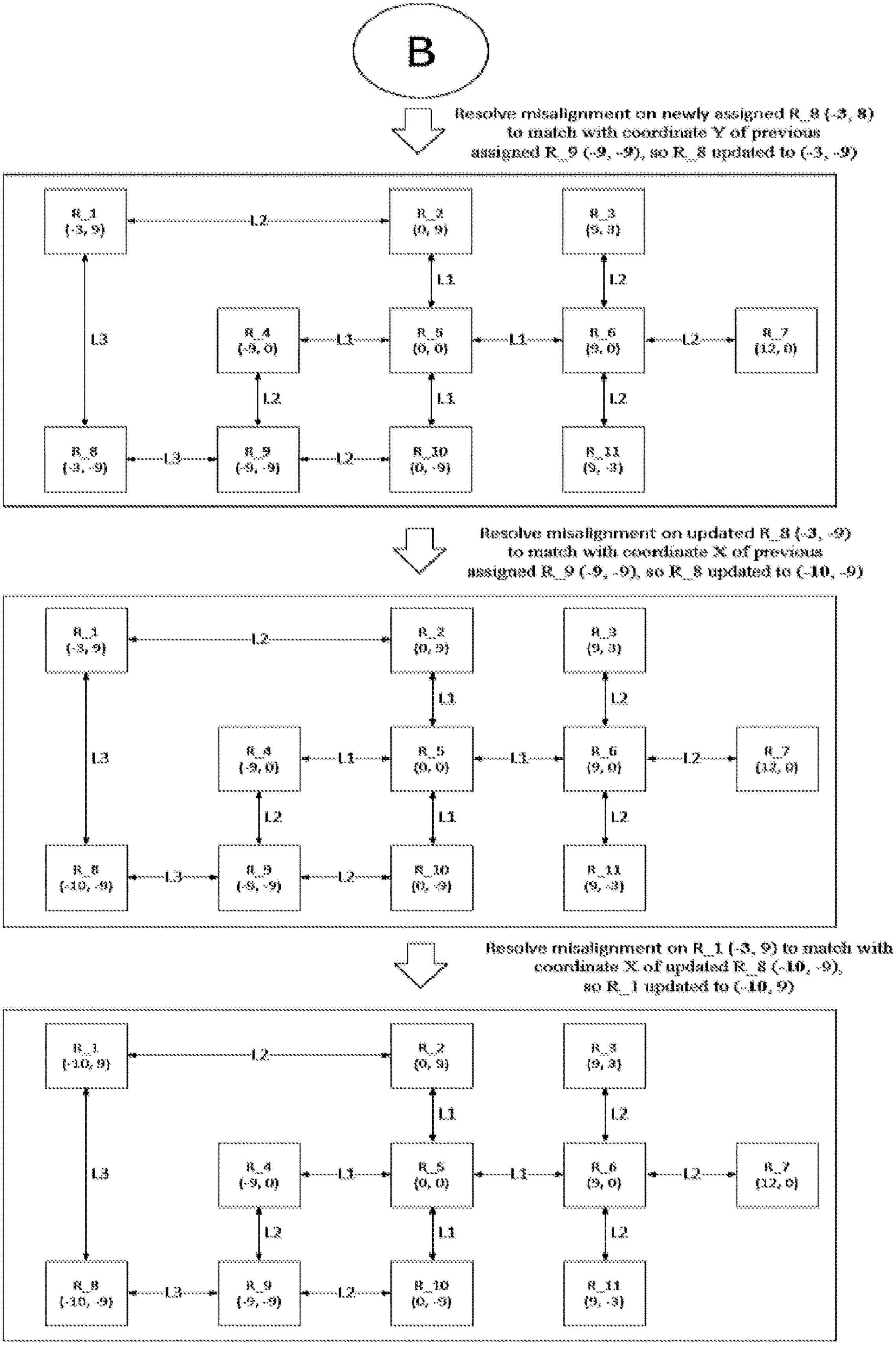
FIG. 10 is an example illustrating part-three of the process flow in continuation to FIG. 9.

For the newly assigned adjacent router, resolve any misalignment (if there is any) with all previous assigned routers. Misalignment can be detected by comparing the X and/or Y coordinates of two connected routers. For the East or West port direction, misalignment is identified when the Y coordinate values of both routers differ; for the North or South port direction, misalignment is identified when the X coordinate values of both routers differ. An example of resolving coordinate misalignment is shown in FIG. 8, FIG. 9, and FIG. 10. This example applies flow no. 5 to calculate the distance for every router link layer, where:

$$X_{L3} \text{ and } Y_{L3} = LOR = 1$$

$$X_{L2} \text{ and } Y_{L2} = (2 * LOR) + 1 = 3$$

$$X_{L1} \text{ and } Y_{L1} = 3 * 5 = 9$$

The new coordinates (X, Y) of the adjacent router are generated based on the router link layer value and the direction from the previous assigned router. In general, $$\text{adjacent router coordinate } (X, Y) = (X_{previous} + X_{Ln}, Y_{previous} + Y_{Ln}),$$

where $X_{previous}$ and $Y_{previous}$ are previous assigned routers (X, Y).

$X_{Ln}$ and $Y_{Ln}$ are the coordinate X or Y distance for specific router link layer values, between the adjacent router and previous assigned router.

If the adjacent router connected to the East port of previous assigned router, then $$X_{Ln} = \text{positive integer},$$

$$Y_{Ln} = 0$$

$$\text{adjacent router coordinate } (X, Y) = (X_{previous} + X_{Ln}, Y_{previous})$$

If the adjacent router connected to the West port of previous assigned router, then $$X_{Ln} = \text{negative integer},$$

$$Y_{Ln} = 0$$

$$\text{adjacent router coordinate } (X, Y) = (X_{previous} - X_{Ln}, Y_{previous})$$

If the adjacent router connected to the North port of previous assigned router, then $$X_{Ln} = 0,$$

$$Y_{Ln} = \text{positive integer}$$

$$\text{adjacent router coordinate } (X, Y) = (X_{previous}, Y_{previous} + Y_{Ln})$$

If the adjacent router connected to the South port of previous assigned router, then $$X_{Ln} = 0,$$

$$Y_{Ln} = \text{negative integer}$$

$$\text{adjacent router coordinate } (X, Y) = (X_{previous}, Y_{previous} - Y_{Ln})$$

Swapping the direction of the East-West or North-South port, resulting in different positive or negative sign values for $X_{Ln}$ and $Y_{Ln}$, doesn't affect the method of automatically generating and assigning the unique ID to every router.

7. Apply the (X, Y) Shrinking Technique:

Loop through all assigned routers and apply the coordinate (X, Y) shrinking technique to get all (X, Y) coordinates in positive integer numbers in optimized ascending order.

Figure 11:
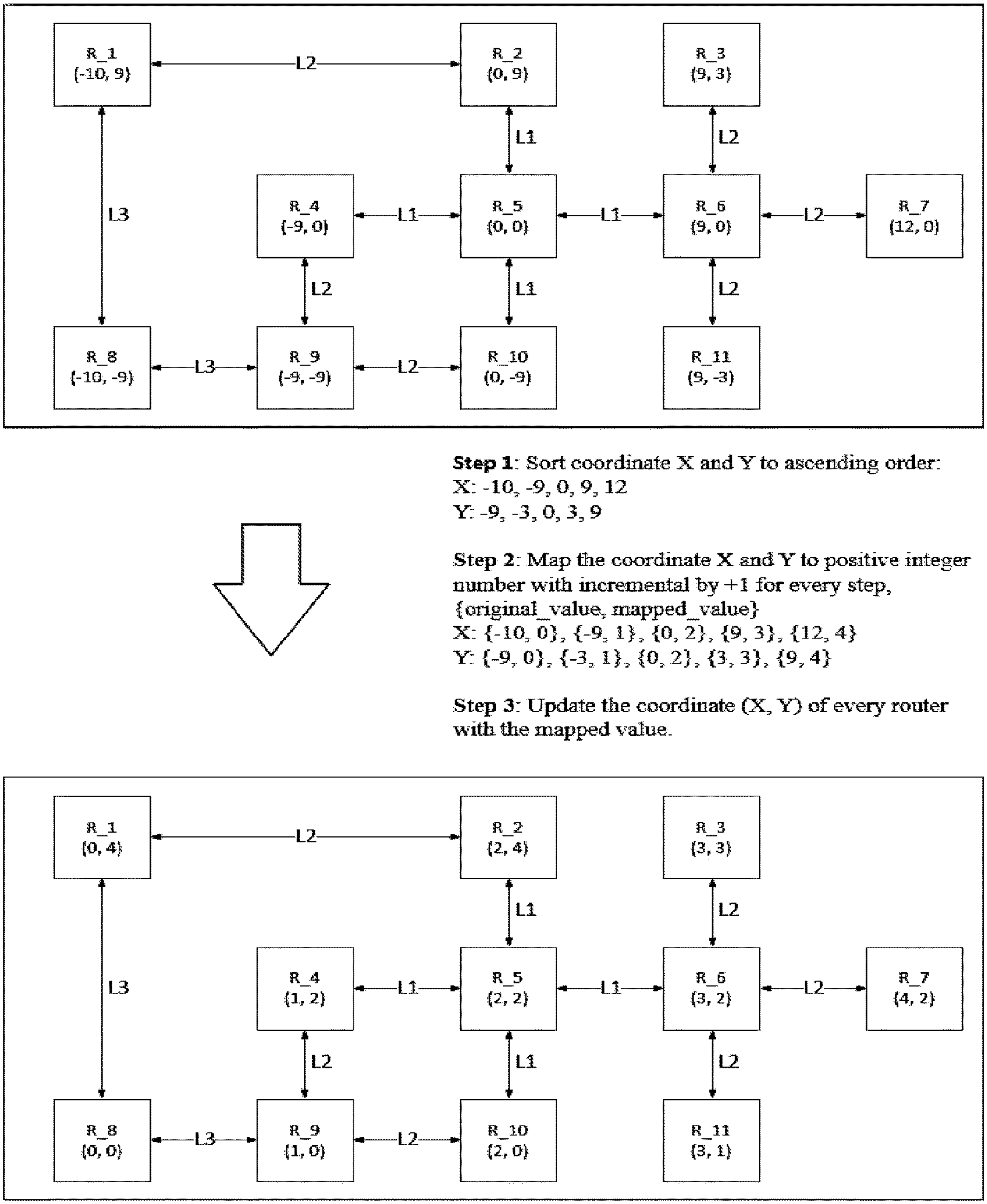
FIG. 11 illustrates a coordinate (X, Y) shrinking technique applied to the same custom mesh topology shown in FIG. 10.

FIG. 11 shows the coordinate (X, Y) shrinking technique (steps 1-3) applied to the same custom mesh topology shown in FIG. 10. Step 1 in FIG. 11 sorts the coordinates X and Y in ascending order, but the actual implementation can sort them in any order independently for coordinates X and Y.

8 & 9. Complete Router (X, Y) Assignments for all Planar

Go to new planar by incrementing Z+1 and repeat steps no. 3 to no. 7 until all planar router coordinates (X, Y, Z) are fully generated and assigned.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A computer-implemented method of generating and assigning identifier information to each router in a network-on-chip for arbitrating a data packet, comprising steps of:

generating and assigning a planar-axis coordinate, Z, to every router for each planar;

generating and assigning an ascending value to each router link layer for every link in between two routers of the same planar-axis coordinate;

selecting one router with the smallest value of the router link layer as an origin router;

assigning the origin router with a coordinate comprising a horizontal-axis, X, and a vertical-axis, Y;

calculating a distance of the coordinates X and Y with respect to the router link layer for every router link layer;

generating and assigning a coordinate comprising a horizontal-axis, X, and a vertical axis, Y, to each router adjacent to the origin router based on the distance calculated for every router link layer, followed by a next connecting router of the same planar-axis coordinate;

applying coordinate shrinking to get all coordinates in positive integer numbers with optimized ascending order; and repeating the steps from generating and assigning an ascending value to each router link layer for every link in between two routers of a subsequent planar-axis coordinate to complete the generation and assignment of coordinates to all planar-axis routers.

2. The computer-implemented method as claimed in claim 1, wherein generating and assigning an integer 0 or ignoring the planar-axis coordinate, Z if the network-on-chip is a two-dimensional mesh topology having a single planar.

3. The computer-implemented method as claimed in claim 1, wherein generating and assigning an integer 0 as the planar-axis coordinate, Z for a bottom planar, and incrementing or decrementing the integer by +1 or −1 for a subsequent planar if the network-on-chip is a three-dimensional mesh topology having multiple planar.

4. The computer-implemented method as claimed in claim 1, wherein assigning the origin router with the coordinate comprising horizontal-axis, X, and vertical-axis, Y equals to zero.

5. The computer-implemented method as claimed in claim 1, wherein the step of generating and assigning a coordinate comprises horizontal-axis, X, and vertical-axis, Y to each router adjacent to the origin router followed by the next connecting router of the same planar-axis coordinate, further comprising the steps of:

detecting misalignment of routers that have been assigned with the coordinate;

calculating the distance for every router link layer; and generating a new coordinate based on a router link layer value and direction from a previously assigned router.

6. The computer-implemented method as claimed in claim 5, wherein detecting misalignment of routers that have been assigned with the coordinate, comprising the steps of:

comparing the horizontal-axis, X, the vertical-axis, Y, or both X and Y coordinates of two connected routers;

wherein misalignment is identified when the vertical-axis, Y, coordinate of both routers are different for an east or west port direction, and when the horizontal-axis, X, coordinate values of both routers are different for a north or south port direction.

7. The computer-implemented method as claimed in claim 6, wherein after identifying the misalignment, resolving the misalignment by changing the horizontal-axis, X, coordinates and the vertical-axis, Y, coordinates of the newly assigned router to match the horizontal-axis, X, coordinates and the vertical-axis, Y, coordinates of the connected routers.

8. The computer-implemented method as claimed in claim 1, further comprising the step of embedding the identifier information of each router after generation and assignment into the data packet.

9. The computer-implemented method as claimed in claim 8, wherein the identifier information includes absolute coordinates, relative directions, output port number or any combination thereof for each router to arbitrate the data packet.

10. The computer-implemented method as claimed in claim 1, wherein applying coordinate shrinking to get all coordinates in positive integer numbers with optimized ascending order comprising the steps of:

sorting the horizontal-axis, X, coordinates, and the vertical-axis, Y, coordinates in ascending or descending order;

mapping the horizontal-axis, X, coordinates, and the vertical-axis, Y, coordinates to a positive integer number with incremental +1 for ascending order or decremental −1 for descending order; and updating the horizontal-axis, X, coordinates, and the vertical-axis, Y, coordinates of every router with a mapped value.

* * * * *